United States Patent [19]

Quigley et al.

[11] Patent Number: 5,036,833

[45] Date of Patent: Aug. 6, 1991

[54] SOLAR PANEL

[75] Inventors: William M. Quigley; Mark P. Forkin; Peter E. Connolly, all of Warrenpoint, Northern Ireland

[73] Assignee: Claudius Enterprises Limited, Ireland

[21] Appl. No.: 484,850

[22] Filed: Feb. 26, 1990

[51] Int. Cl.$^5$ .................................................. F24J 2/26
[52] U.S. Cl. ...................................... 126/429; 126/449
[58] Field of Search ................................. 126/429, 449

[56] References Cited

U.S. PATENT DOCUMENTS

| | | | |
|---|---|---|---|
| 4,082,082 | 4/1978 | Harvey | 126/449 |
| 4,129,117 | 12/1978 | Harvey | 126/449 |
| 4,212,292 | 7/1980 | Reinert | 126/429 |
| 4,257,396 | 3/1981 | Reinert | 126/429 |
| 4,282,860 | 8/1981 | Koizumi et al. | 126/429 |
| 4,306,542 | 12/1981 | Reinert | 126/429 |
| 4,324,231 | 4/1982 | Reinert | 126/429 |

Primary Examiner—Carroll B. Dority
Attorney, Agent, or Firm—Ostrolenk, Faber, Gerb & Soffen

[57] ABSTRACT

A solar panel includes: a rectangular space frame constructed from timber members 1a, 1b, 1c and 1d; a sheet of plasterboard 2 beneath the timber frame; a foil backing 3 on the plasterboard; and a shaped bed 4 made of polyurethane foam which is moulded into position in the housing constituted by the timber frame and the sheet of plasterboard 2, and which adheres in an airtight manner to the housing. A foil cover 5 is provided on top of the shaped bed 4. Above the foil cover 5 is a solar radiation absorber 6, comprising a matrix of glass fibre which is bonded by a phenol formaldehyde resin, seated in a recess 4a in the bed 4; and a housing cover 7 comprising a sheet of toughened glass. Cover retention means comprising aluminium extrusions 21 and silicone gaskets 22 secure the housing cover 7 in position. A series of air inlet ports 9 across one end of the panel, and a series of air outlet ports 10 across the other end of the panel enable air to circulate through the panel which can function as a solar panel and a heat exchanger for absorbing ambient heat from the atmosphere by circulating to the solar panel air at a temperature lower than the temperature of the ambient air.

11 Claims, 4 Drawing Sheets

SOLAR PANEL

The present invention relates to solar panels.

The invention relates particularly to solar panels of the type which comprise a housing, a cover on the housing which transmits incident solar radiation into the housing, a solar radiation absorber in the housing, and air inlet and outlet ports to enable air to be circulated through the panel to collect heat from the panel.

One object of the present invention is to provide a cheaper and more efficient solar panel of the above type. Another object of the invention is to provide a solar panel of the above type which may be used not only to collect heat from solar radiation but also, in an alternative mode, as a heat exchanger for collecting ambient heat from the atmosphere. A further object of the present invention is to provide a solar panel of the above type from which air may be circulated directly to a space to be heated.

The invention provides a solar panel comprising a housing; a cover on the housing, in the form of a sheet of glazing which can transmit solar radiation and which is a moderate conductor of heat; a solar radiator absorber within the housing, comprising a matrix of long strand glass fibre; an air inlet and an air outlet, whereby as the cover is a moderate conductor of heat, the solar panel may also be used as a heat exchanger for absorbing ambient heat from the atmosphere by circulating to the solar panel air at a temperature lower than the temperature of the ambient air. Because the heat conductivity is only moderate, relatively little of the heat absorbed from incident solar radiation during the day is lost to the atmosphere.

Because the solar radiation absorber comprises a material in the form of very long strands, chaff or dust are not given off as would happen in the case of fibreglass used for thermal insulation purposes which is made in much shorter lengths. Thus the solar panel of the invention may be directly connected to a space to be heated without any health hazard or risk of irritation to persons in that space.

Preferably, the majority of the strands of glass fibre are in the range of 0.5 to 5 m in length.

Conveniently, the air inlet is remote from the air outlet and the density of the matrix of glass fibre increases from its upper surface to its base.

Advantageously, the housing includes a base and a plurality of side walls, and a layer of insulating material is located between the matrix of glass fibre and the base of the housing, with the air inlet and air outlet communicating from the matrix of glass fibre, through the layer of insulating material to an external surface of the housing.

Preferably, the side walls of the housing include at least two longitudinal side walls which extend longitudinally at each end thereof to provide rafters whereby the solar panel energy may form part of the roof of a house.

Advantageously, the longitudinal side walls are manufactured from the stress graded timber.

Conveniently, the layer of insulating material is sandwiched between the two sheets of foil material.

Preferably, the base of the housing comprises plaster board.

The inlets and outlets to the solar panel may be disposed at opposite ends of the panel, and may each extend across a substantial part of the width of the panel.

The result, in operation, is a substantially uniform air flow along the panel, as a consequence of which heat absorption is maximised and the air pressure drop is minimised.

The invention will now be described more particularly with reference to the accompanying drawings which show, by way of example only, one construction of solar panel according to the invention. In the drawings.

Figure 1:
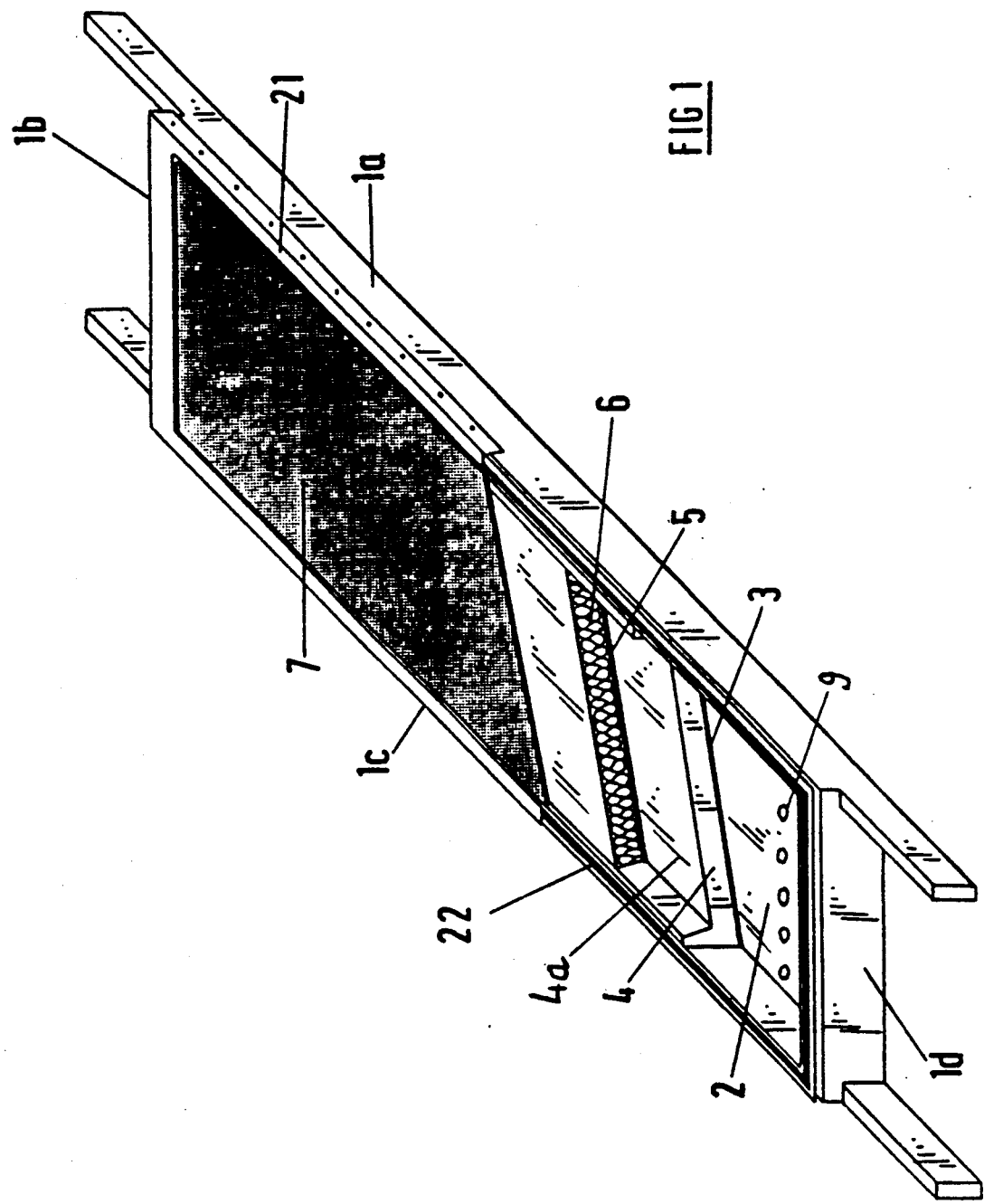
FIG. 1 is a perspective partially cut away view of a solar panel according to the invention.
Figure 2:
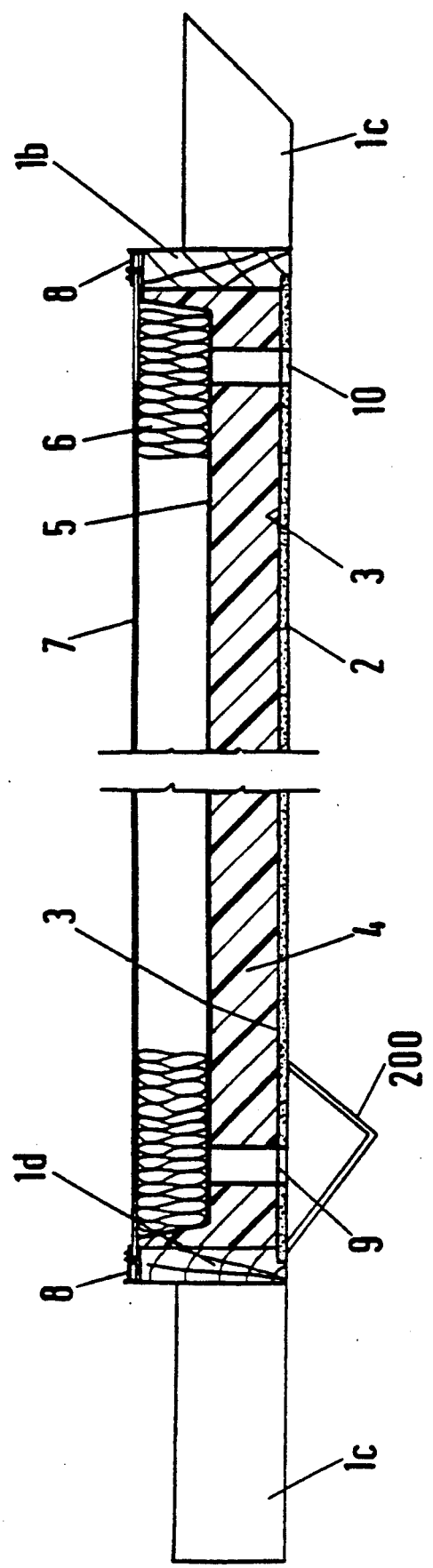
FIG. 2 is a longitudinal sectional elevation of the panel.
Figure 3:
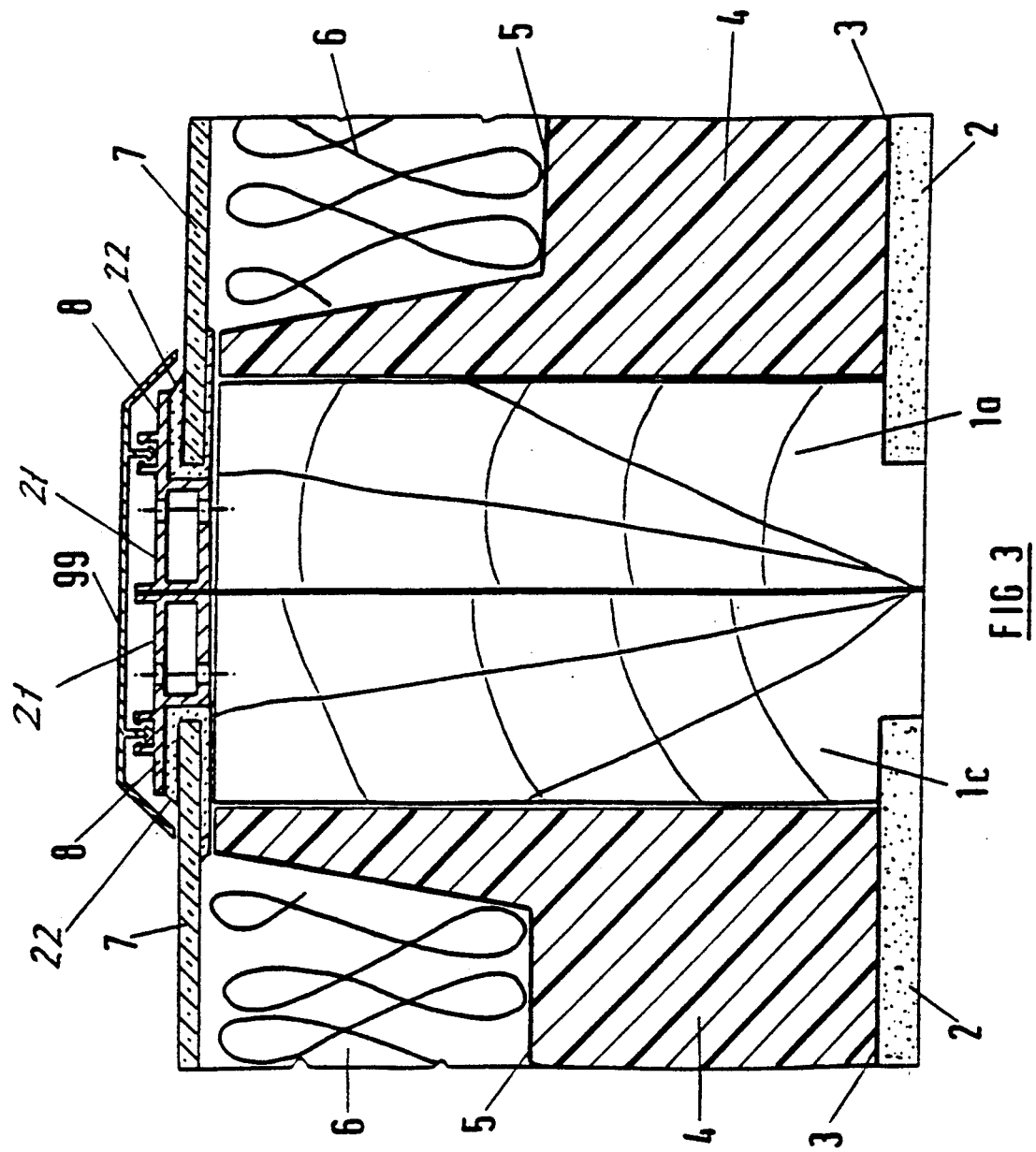
FIG. 3 is a cross-sectional end view showing portions of two solar panels in juxtaposition.

Referring to the drawings the solar panel comprises:

a rectangular space frame constructed from timber members 1a, 1b, 1c and 1d;

a sheet of plasterboard 2 beneath the timber frame;

a foil backing 3 on the plasterboard;

a shaped bed 4 made of polyurethane foam which is moulded into position in the housing constituted by the timber frame and the sheet of plasterboard 2, and which adheres in an air-tight manner to the housing;

a foil cover 5 on top of the shaped bed 4;

a solar radiation absorber 6, comprising a matrix of glass fibre which is bonded by a phenol formaldehyde resin, seated in a recess 4a in the bed 4; a housing cover 7 comprising a sheet of toughened glass;

cover retention means comprising aluminium extrusions 21 and silicone gaskets 22; and a series of air inlet ports 9, (see FIG. 1) across one end of the panel, and a series of air outlet ports 10 (only one of which is shown in FIG. 2) across the other end of the panel.

The foil layers 3 and 5 above and below the polyurethane bed 4 seal in the polyurethane thereby preventing degradation, and the upper foil layer 5 also serves as a reflective surface for solar radiation within the housing.

In operation, during daylight hours, direct or diffuse solar radiation falling on the housing cover 7 is transmitted through the cover and reaches the absorber 6. The absorber 6 is of very open construction and the radiation passes down through the volume of air which permeates the absorber, and undergoes multiple reflections off the surface of the absorber material and also off the upper surface of the foil layer 5 and the lower surface of the housing cover 7. In this manner the radiation gives up its energy, warming the volume of air. Air enters the inlet ports 9 at one end, passes through the absorber 6 where it is heated, and leaves through ports 10 at the other end. The air passing along the solar panel is widely and evenly distributed across the full width and height of the panel, resulting in uniform flow which gives maximum heat collection, and minimum pressure drop.

In operation, during night hours, when there is no incident solar radiation, the solar panel may be operated in an alternative mode in which air at a temperature lower than the ambient outdoor air temperature is circulated through the solar panel, where it is heated by thermal conduction through the housing cover 7, and the heat thus collected may be transferred to a heat store.

Figure 4:
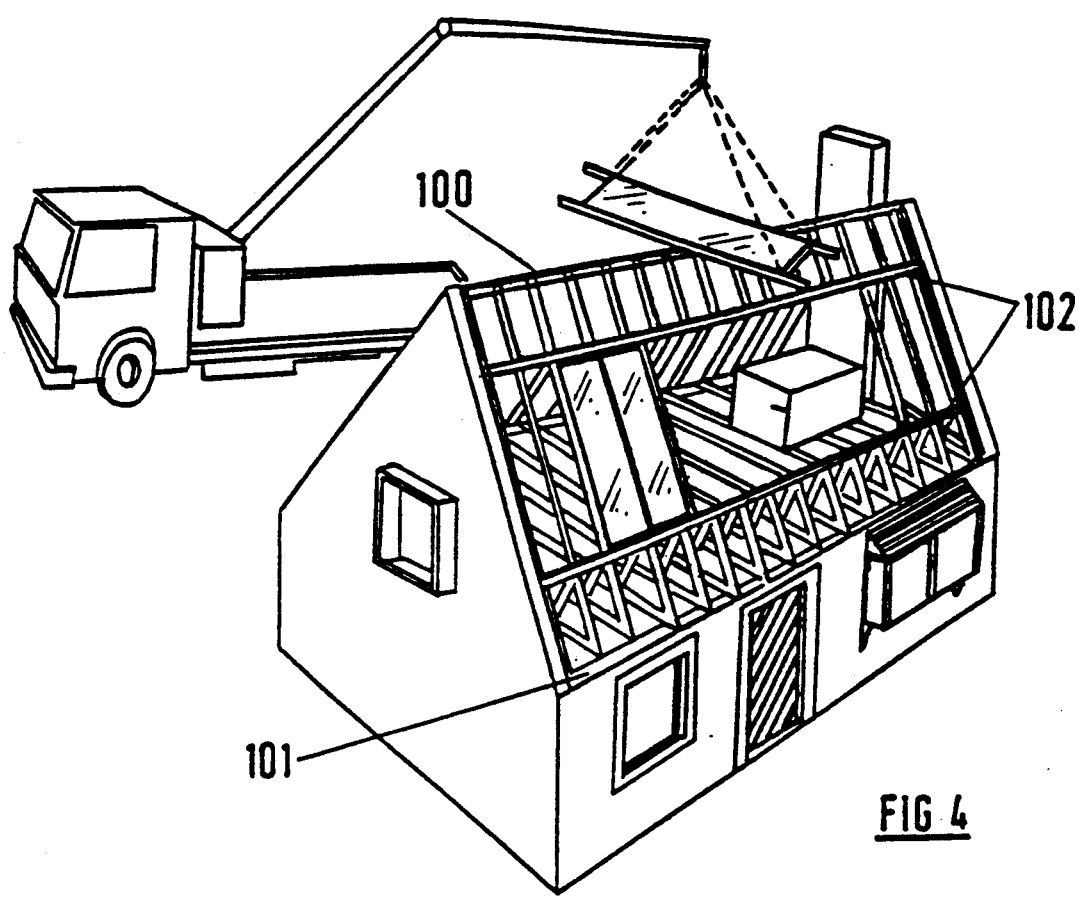
FIGS. 4 and 4a are perspective views of a house during construction, showing one slope of the roof being constructed from solar panels according to the invention.
Figure 4A:
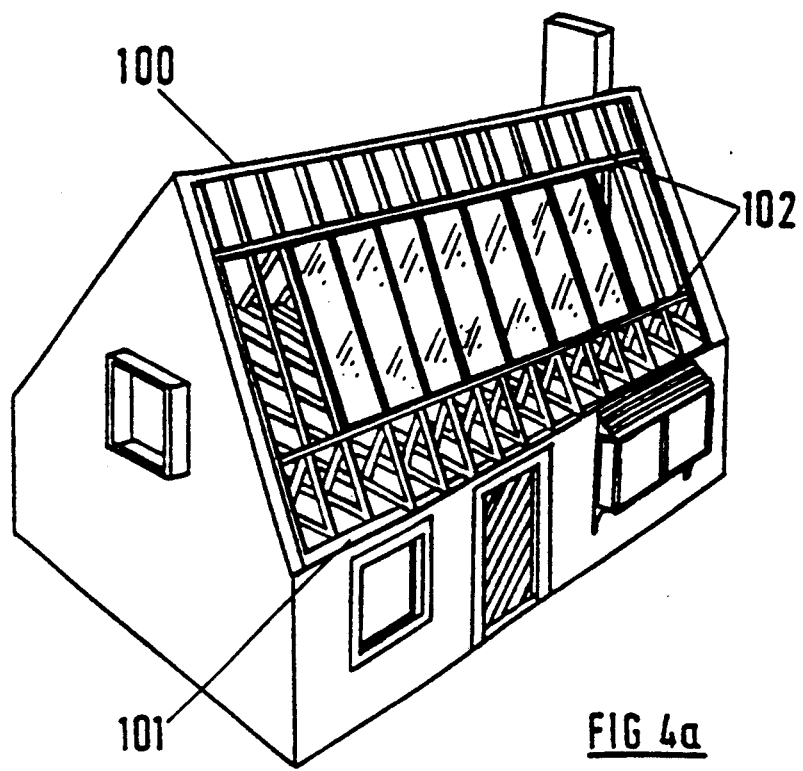

Installation of the solar panel will now be described with particular reference to FIG. 4. The panel is built and tested at the factory. The panel is delivered as a unit to the building site. When the roof is being constructed the panel is positioned between the ridge 100 and the wall plate 101, and secured in position. Further panels are secured in position side by side. The panels together constitute a roof. Each panel is bolted to a purlin 102 from the back. Bolting from the back means that the finished roof is more aesthetically pleasing as there are no projecting bolt heads, and that there is less likelihood of water leaking into the collector as there are no bolts on the upper or weather surface and that during installation shelter is available from the weather. All the edges of the solar panel are covered with a flashing 99 to weatherproof the panels.

Viewed from outside the house the individual solar panels, and the roof as a whole, present a dark matt finish, arising from the operation of the cover 7 and absorber 6. Viewed from inside the house, the individual solar panels and the roof as a whole present a plasterboard finish. No further structural elements are necessary. When air ducting is subsequently installed in the house, the ducting may be connected to the ends of the solar panels. This connection in each case comprises a manifold 200 (see FIG. 2) which has a length equal to the width of an integral number of solar panels, for example equal to the width of three solar panels. Any gap between adjacent panels is sealed, and the manifold is then secured across the end of a number of panels.

The absorber 6 will now be described in more detail. The absorber comprises a matrix of fibreglass threads which have been bonded by a thermosetting resin, such as phenol formaldehyde resin. The absorber 6 provided with a dark matt finish means of a carbon dye to improve absorption. The majority of glass fibres threads have a length in the range of 3 to 5 meters, to prevent chaff or dust. The glass fibre threads have a diameter of about 20 to 50 microns to give mechanical properties which facilitate handling and transportation of the material. The matrix has a density of between 2 and 6 kilograms per cubic meter to optimise absorption. If the matrix were of uniform density throughout, then more heating would take place nearer the top of the panel. Accordingly, the density of the absorber 6 increases with distance from the cover 7, so as to give uniform absorption at different levels.

The dimensions of the solar panels are 3 or 4 meters in length, 1 meter in width, and 16.5 centimeters in depth. The overall length of the rafters is 4.8 or 6.6 meters respectively. The dimensions given may of course be varied to suit particular requirements.

We claim:

1. A solar panel, comprising:
   an elongate housing including a solar radiation transmitting cover and a reflective base held in spaced apart relationship by side and end members;
   a solar radiation absorber within the housing;
   inlet means enabling fluid to enter the absorber at one end of the housing; and
   outlet means enabling the fluid to exit from the absorber at an opposite end of the housing, the absorber being in the form of a matrix of long strand glass fibers, the density of the matrix increasing from the cover to the base of the housing.

2. A solar panel according to claim 1, in which the density of the matrix varies between 2 and 6 kilograms per cubic meter.

3. A solar panel according to claim 1, in which the majority of the strands of glass fiber are between 0.5 to 5 meters in length.

4. A solar panel according to claim 3, in which the density of the matrix varies between 2 and 6 kilograms per cubic meter.

5. A solar panel according to claim 4, in which the glass fiber matrix is bonded by a thermosetting plastics material.

6. A solar panel according to claim 5, in which the thermosetting plastics material is a phenol formaldehyde resin.

7. A solar panel according to claim 1, in which the solar radiation transmitting cover is a single sheet of glazing which is a moderate conductor of heat enabling the solar panel to be used, when solar radiation is absent, as a heat exchanger for absorbing ambient heat from the atmosphere by passing through the solar panel air at a temperature lower than the temperature of the ambient air.

8. A solar panel according to claim 1, including a layer of insulating material between the absorber and the base of the housing and a reflector foil located between the layer of insulation and the absorber, the air inlet and air outlet means passing through the layer of insulating material.

9. A solar panel according to claim 8, in which the layer of insulating material is sandwiched between the reflector foil and another sheet of foil material.

10. A solar panel according to claim 1, in which the side walls extend longitudinally at each end thereof to provide rafters whereby the solar panel may form part of the roof structure of a house.

11. A space heating system comprising a solar panel according to claim 1, and a system of ducting in which the fluid inlet means and outlet means of the solar panel are connected to the system of ducting.

* * * * *